INVENTORS
HENRY W. BIGGE
JACK S. WEBBER
WILLIAM A. WHITMIRE
BY
Owen, Wickersham, & Erickson
ATTYS.

INVENTORS
HENRY W. BIGGE
JACK S. WEBBER
WILLIAM A. WHITMIRE
BY
Owen, Wickersham & Erickson
ATTYS INVENTORS
HENRY W. BIGGE
JACK S. WEBBER
WILLIAM A. WHITMIRE
BY
Owen, Wickersham & Erickson
ATTYS.

INVENTORS
HENRY W. BIGGE
JACK S. WEBBER
WILLIAM A. WHITMIRE
BY
Owen, Wickersham & Erickson
ATTYS.

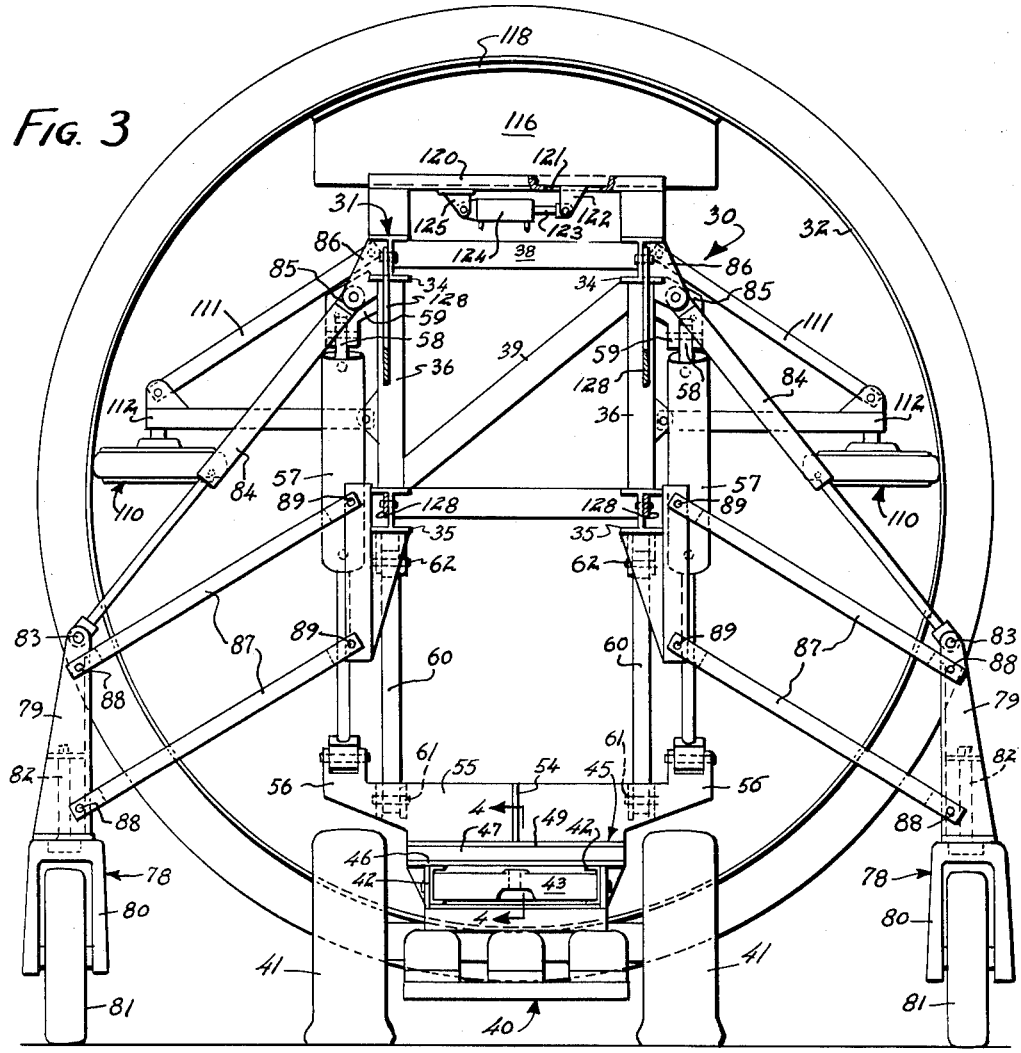

June 28, 1966                H. W. BIGGE ETAL              3,258,135
           APPARATUS FOR TRANSPORTING AND HANDLING LARGE
                       TUBULAR STRUCTURAL SECTIONS
Filed June 30, 1964                                  14 Sheets-Sheet 6

INVENTORS
                                          HENRY W. BIGGE
                                          JACK S. WEBBER
                                          WILLIAM A. WHITMIRE
                                       BY

Owen, Wickersham & Erickson
                                                    ATTYS.

June 28, 1966  H. W. BIGGE ETAL  3,258,135
APPARATUS FOR TRANSPORTING AND HANDLING LARGE
TUBULAR STRUCTURAL SECTIONS
Filed June 30, 1964  14 Sheets-Sheet 7
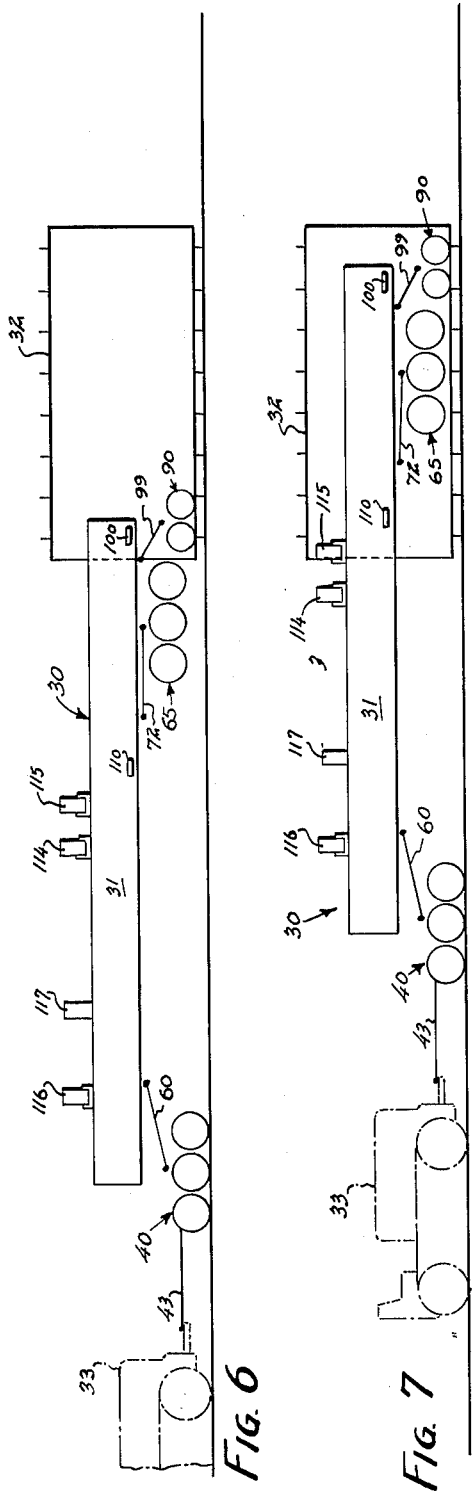
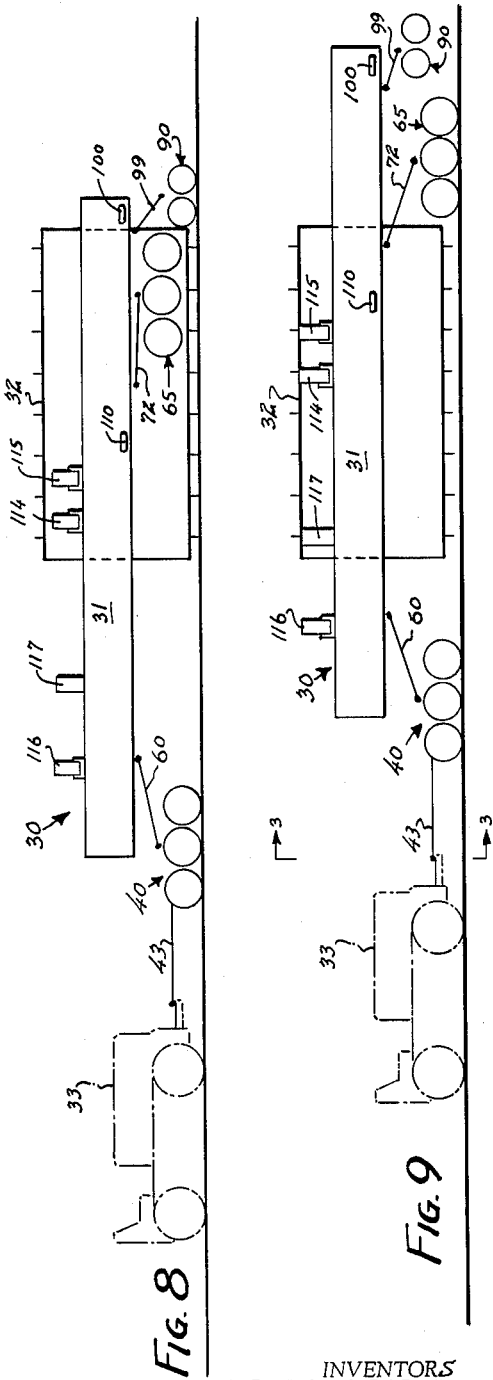
INVENTORS
HENRY W. BIGGE
JACK S. WEBBER
WILLIAM A. WHITMIRE
BY
Owen, Wickersham & Erickson
ATTYS INVENTORS
HENRY W. BIGGE
JACK S. WEBBER
WILLIAM A. WHITMIRE
BY
Owen, Wickersham & Erickson
ATTYS INVENTORS
HENRY W. BIGGE
JACK S. WEBBER
WILLIAM A. WHITMIRE
BY
Owen, Wickersham, Erickson
ATTYS

INVENTORS
HENRY W. BIGGE
JACK S. WEBBER
BY WILLIAM A. WHITMIRE

Owen, Wickersham, Erickson
ATTYS

June 28, 1966 H. W. BIGGE ETAL 3,258,135
APPARATUS FOR TRANSPORTING AND HANDLING LARGE
TUBULAR STRUCTURAL SECTIONS
Filed June 30, 1964 14 Sheets-Sheet 12

INVENTORS
HENRY W. BIGGE
JACK S. WEBBER
WILLIAM A. WHITMIRE
BY
Owen, Wickersham & Erickson
ATTYS.

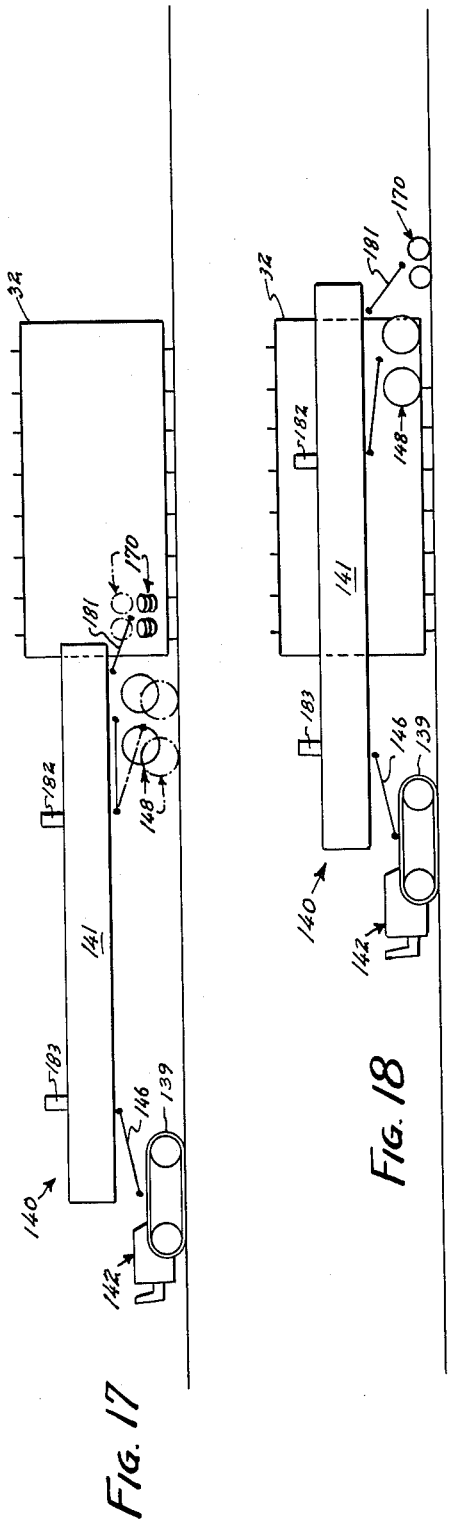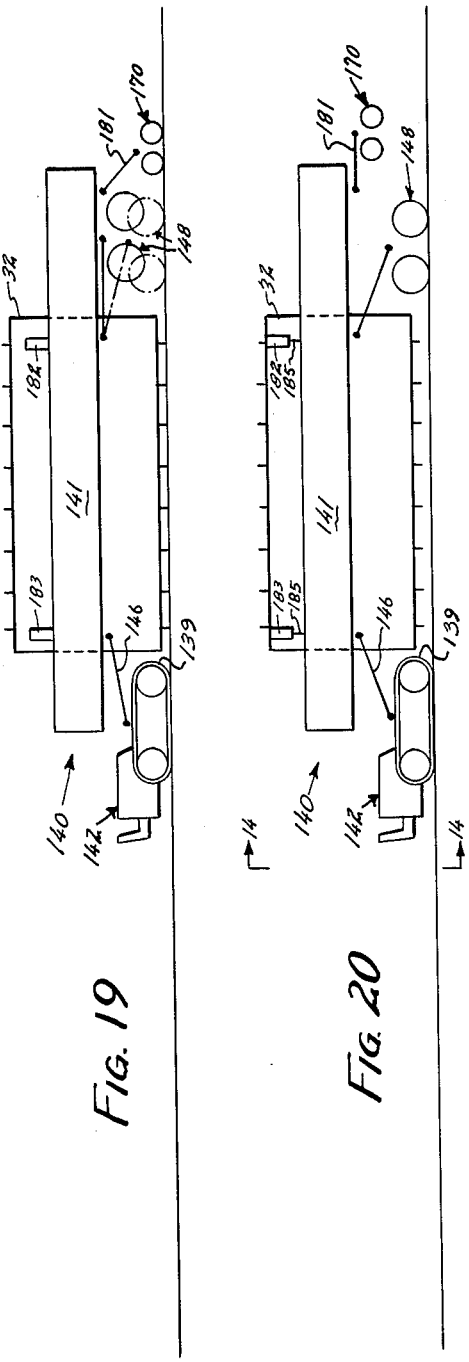

INVENTORS
HENRY W. BIGGE
JACK S. WEBBER
BY WILLIAM A. WHITMIRE

United States Patent Office 3,258,135
Patented June 28, 1966

3,258,135
APPARATUS FOR TRANSPORTING AND HANDLING LARGE TUBULAR STRUCTURAL SECTIONS
Henry W. Bigge, 50 Marsh Place, Oakland, Calif., and Jack S. Webber, Walnut Creek, and William A. Whitmire, Castro Valley, Calif.; said Webber and said Whitmire assignors to said Bigge
Filed June 30, 1964, Ser. No. 379,217
28 Claims. (Cl. 214—1)

This invention relates to an apparatus for handling large tubular sections used in constructing tunnels, sewers, culverts or other large underground conduits.

In the construction of tunnels such as underground conduits for dams it is sometimes necessary to provide a strong rigid tubular lining within the excavated tunnel cavity to maintain unobstructed structural integrity. An obvious method of constructing such a lining is to interconnect a plurality of tubular sections within the tunnel cavity. Such tunnel sections may be formed from precast concrete or they may be prefabricated metal structures. In either case they are usually extremely large and heavy and hence, extremely difficult to handle with conventional equipment. Thus, the problem prior to the present invention in installing a prefabricated tunnel liner was that of providing a practical means for handling large, heavy and unwieldly prefabricated tunnel sections. More specifically, the problem entailed the provision of a suitable apparatus capable of: (1) lifting the tunnel section from the ground at a storage location; (2) transporting it from the storage area and through a portion of the unfinished tunnel to the installation site; (3) and then maneuvering the tunnel section through the tunnel cavity and positioning it into alignment with the already installed tunnel section so that the two sections can be permanently connected together.

A major object of the present invention is to provide an apparatus that will solve the aforesaid problem and provide the above three necessary functions for manipulating large, heavy tubular tunnel sections in constructing a tunnel.

A more specific object of the invention is to provide an apparatus for handling larger tubular sections that can lift the section completely free of the ground, move it forward or backward, and move it up or down or horizontally within limits without moving forward or backward, thereby enabling the section to be adjusted into position to become aligned with and ultimately connected to another like section.

Another object of the present invention is to provide an apparatus for transporting large heavy tubular sections and for maneuvering such sections in relatively confined spaces, and moreover, one that can be operated easily and economically by as few as two persons. One person is required to drive the tractor vehicle for moving the apparatus and, under most situations, a second person may be utilized to operate the valves for controlling the various hydraulic actuators on the apparatus used for manipulating the liner section. Actually, the apparatus can be arranged within the scope of the invention so that all controls are available to a single operator, although in most cases at least one observer would be necessary during the alignment of the tunnel section.

Still another object of the present invention is to provide an apparatus for transporting large, heavy tubular sections wherein the tractor power for moving the apparatus over the ground can either be a separate unit or can be incorporated as a component of the apparatus combination.

Another object of the invention is to provide an apparatus for transporting and handling large, heavy tubular sections which has unusual stability and is not subject to side sway even when the tubular section is raised upwardly to align it with another such section.

The apparatus for accomplishing the aforesaid and other important objects of the present invention is characterized by a long narrow body member supported by a series of dolly members that are movable up and down independently of the body member. These dollies thus can be manipulated so that the body can be extended completely through a pipe or tunnel section and then be supported at opposite ends of the pipe section by dolly members. The beam is then raised from the supporting dollies by a power source on the apparatus until it engages and lifts the tunnel section free of the ground, enabling it to be transported into the tunnel cavity. As the apparatus approaches the tunnel section already in place, the various dolly members are appropriately extended and retracted so that the end of the body enters it and carries the new tunnel section up into position directly adjacent to and abutting the tunnel section already in place. At this point the apparatus provides means for moving the tunnel section from side to side or up and down so that it can be positioned in exact alignment with the completed tunnel. When the sections are in perfect alignment and abutted together, they can be permanently connected in the desired manner. After this, the dolly members are manipulated in the desired manner to facilitate removal of the apparatus from the tunnel section.

Other objects, advantages and features of my invention will become apparent from the following detailed description of one embodiment thereof, presented in accordance with 35 U.S.C. 112.

In the drawings:

FIG. 3 is a rear end view of the tunnel section handling apparatus shown in FIGS. 1 and 2;

FIG. 4 is an enlarged view in elevation and in section taken along line 4—4 of FIG. 3 showing the fifth wheel assembly of a main dolly;

FIGS. 6 to 12 are a series of schematic views in elevation showing the tunnel section handling apparatus in its various positions during the lifting, transporting and maneuvering of a tunnel liner section;

FIGS. 17 to 22 are a series of schematic views in elevation showing the tunnel section handling apparatus of FIGS. 13 to 15 in its various positions in use;

Figure 1A:
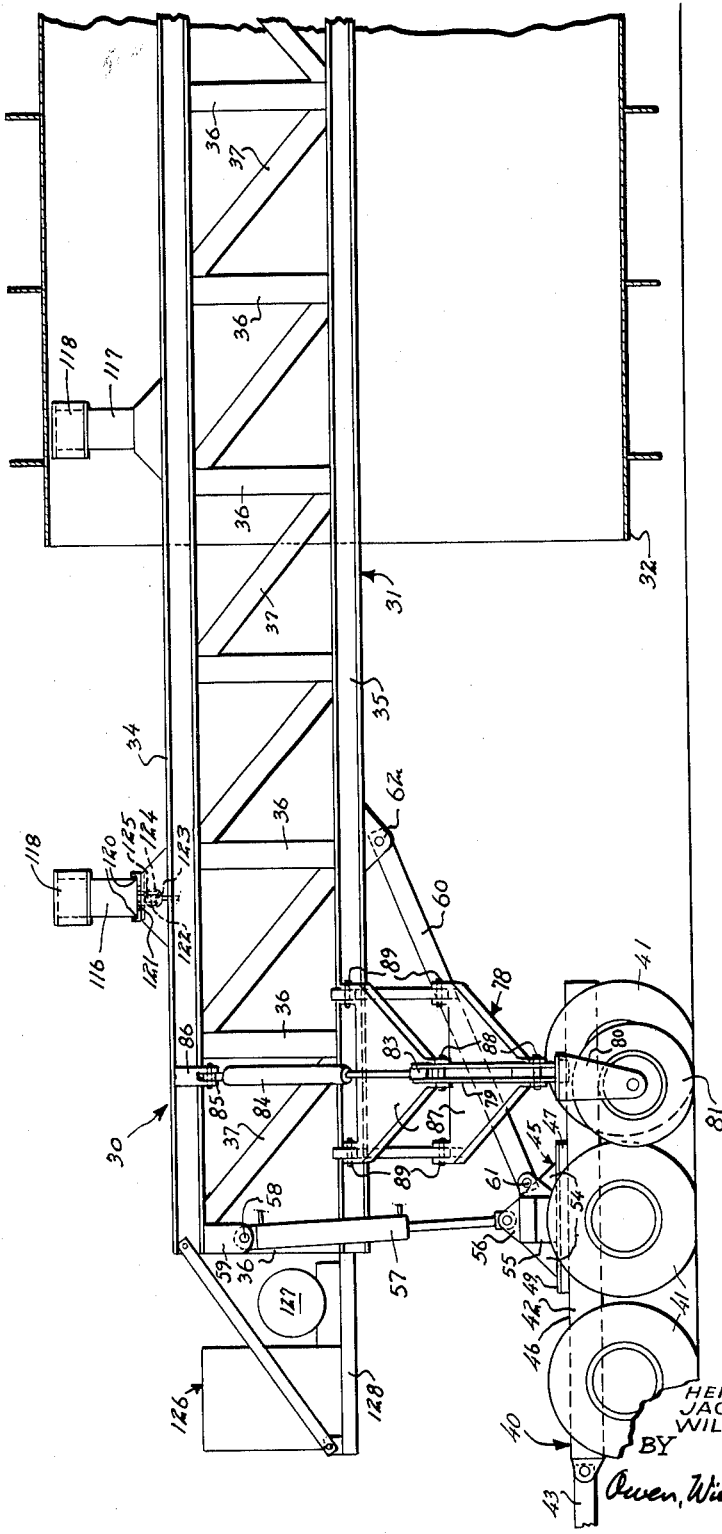
FIG. 1A is a partial view in elevation showing the rear portion of a tunnel section handling apparatus embodying the principles of the invention.

In the drawings, an apparatus embodying the principles of the invention is designated in FIGS. 1 to 12 by the numeral 30. Generally, it comprises a central elongated beam-like body 31 that is greater in length than a tubular member 32 which is can lift, transport and maneuver as required. The body 31 is supported by a plurality of wheels spaced apart along its underside, and one end of the body is connected to and driven by a suitable tractor vehicle 33. The supporting wheels are arranged and connected in pairs or in groups commonly known as trucks or dollies. Each such dolly is connected to and is movable by its own power up and down with respect to the body. Thus, when the dollies are not supporting the weight of the body they are freely retractable or extendable, and when their wheels are supporting the body on the ground they can raise or lower the body and a tubular member thereon.

By raising and lowering the body 31 and its various attached dollies in the appropriate manner and sequence, the body can position itself through a tubular member or tunnel section 32 and be supported by its dollies on the ground at each end thereof. When this is accomplished, the entire body member 31 or portions of it can then be raised to lift the tunnel section from the ground level so that it can be transported to a permanent installation site and maneuvered into the desired location. The complete sequence of operations in handling a tunnel section 32 with the apparatus 30 from the point where it is picked up in a storage area to the point where it is placed in position within a tunnel will be described in detail later with reference to FIGS. 6 to 12.

Figure 1B:
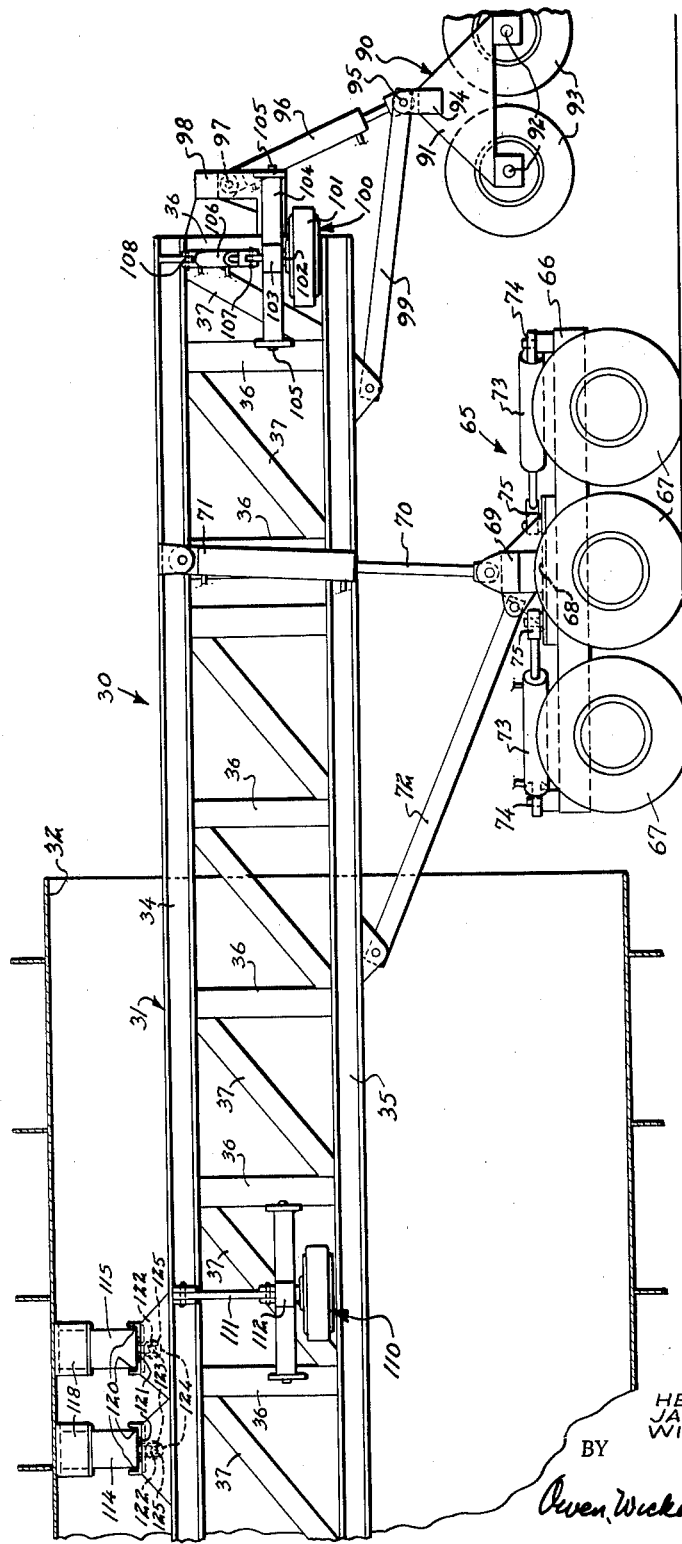
FIG. 1B is a continuation of FIG. 1A showing the front end portion of the tunnel section handling apparatus.
Figure 2A:
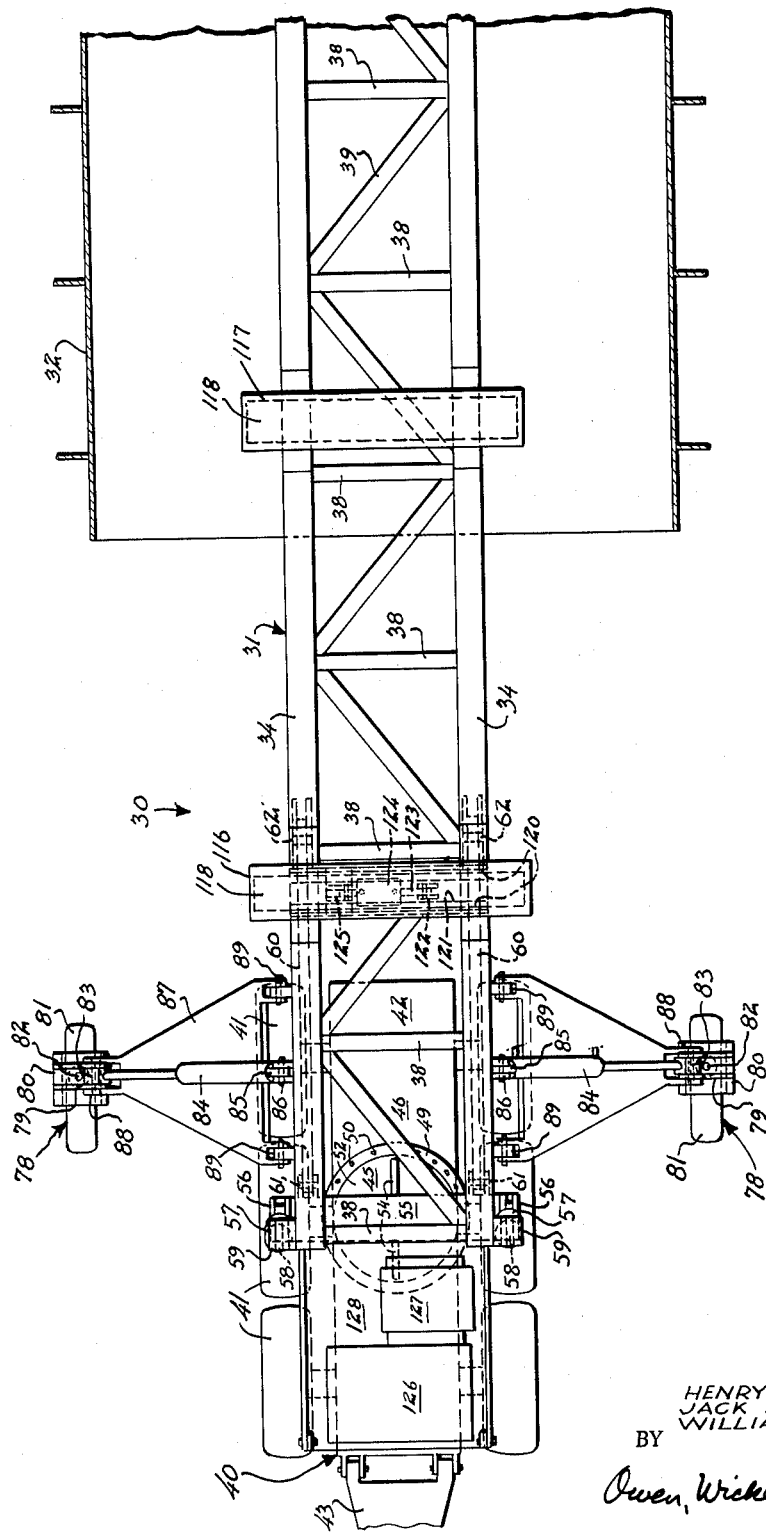
FIG. 2A is a partial plan view of the rear portion of the tunnel section handling apparatus shown in FIG. 1A.
Figure 2B:
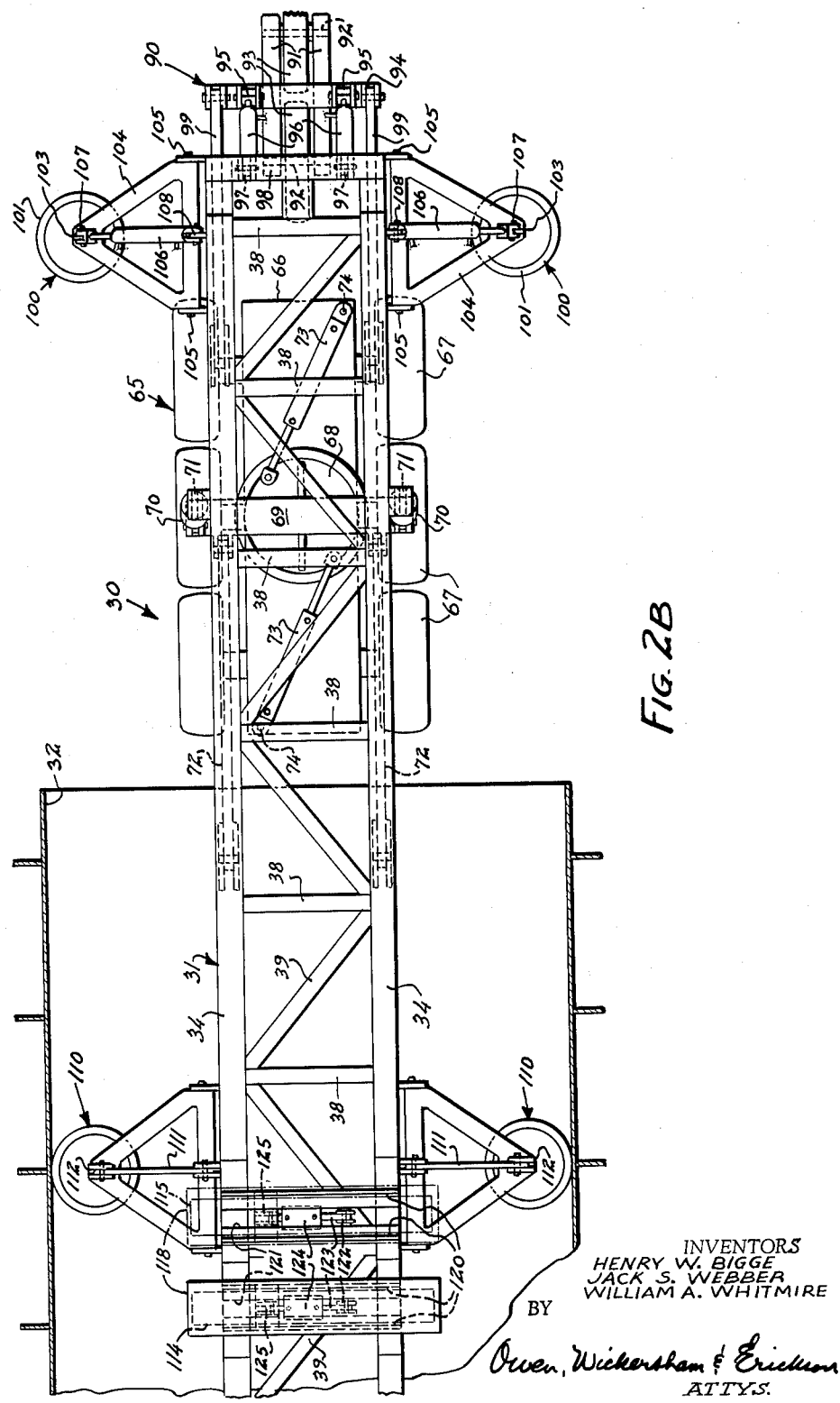
FIG. 2B is a partial plan view of the front portion of the tunnel section handling apparatus shown in FIG. 1B.

The body 31 of the apparatus 30 is preferably prefabricated from structural steel members in the same manner as a bridge or building truss in order to provide it with maximum strength and minimum weight. As shown in FIGS. 1A and 1B, it has a box beam type configuration formed by pairs of upper and lower spaced apart stringers 34 and 35, all of which are parallel to each other and extend horizontally. Each pair of upper and lower stringers 34 and 35 are connected by vertical and diagonal side bracing members 36 and 37. Horizontally aligned upper and lower stringers are connected by similar cross connecting members 38 and 39 (FIGS. 2A and 2B). The actual size and type of the structural members and the connections thereof may be governed by standard engineering practice so that maximum strength commensurate with economy of construction is assured.

Attached to the rear end of the body 31, as shown in FIG. 1A, is a first main supporting truck or dolly 40 having a plurality of wheels 41. The dolly itself may be of conventional construction, having a rigid frame 42 formed by interconnecting structural members supporting a series of longitudinally spaced apart axles each having a pair of the horizontally spaced apart wheels 41. As shown in FIG. 2A, the dolly 40 has three pairs of wheels, but it could have more or less, depending on the load carrying capacity required for the apparatus. Not only is the entire dolly 40 movable up and down, but it is also rotatable with respect to the body 31 so that it can be turned to steer and maneuver the apparatus 30. Pivotally mounted on the front end of the dolly frame 42 is a reach or drawbar member 43 adaptable to be connected with the tractor vehicle 33, as shown in FIG. 7.

Centrally located on the dolly frame 42 is a fifth wheel assembly 45 which rotatably interconnects the dolly 40 and the body 31. As shown in FIG. 4, it comprises an upper deck plate 46 which is attached to the dolly frame 42 and has a circular upright ring member 47 of uniform height that is fixed thereto. Seated on the plate 46 within the member 47 is a bearing member 48, preferably made of a relatively hard wear resistant rubber material. The latter is retained in place by an annular retaining member 49 which bears against the upper edge of the member 47 and the bearing member 48 and is secured in place by a series of spaced apart bolts 50 that extend through the rubber member 48 and the deck plate 46.

The area of the deck plate 46 surrounded by the rubber bearing member 48 is normally lubricated by a heavy grease indicated by the numeral 51 and directly supports a circular fifth wheel base member 52. The latter has an upturned peripheral edge 53 that lies closely adjacent the bearing member 48 and is overlapped and retained by the member 49. The height of the edge 53 is less than that of the ring member 47 so that these members are normally not in contact when the wheels of the dolly 40 are on the ground. Attached to the base member 52 by structural support members 54 is a bolster 55. Pivotally attached near the ends 56 of the bolster 55 are a pair of double acting hydraulic actuators or rams 57 which extend substantially vertically and are pivotally connected at their upper ends 58 to a pair of brackets 59 that are fixed to the body 31. A pair of stabilizing link members 60 are each pivotally attached at one end 61 to the bolster 55 and at their other ends 62 to the underside of the body 31. When hydraulic pressure is supplied to the actuators 57, the body 31 can be raised upwardly or lowered to any desired position.

Near the front end of the body 31 is another dolly 65 which, as shown in FIGS. 1B and 2B, is similar in size and construction to the dolly 40. This dolly also has a frame 66 supporting three axles, each having a pair of wheels 67, and a fifth wheel assembly 68 including a bolster 69 pivotally supporting a pair of hydraulic actuators 70 at the lower ends thereof. The latter are fixed at their upper ends 71 to the body 31. A pair of stabilizing link members 72 are provided for the dolly 65 which are pivotally attached at their ends to the bolster 69 and the body 31. To provide a means for turning the dolly 65 with respect to the body 31 and thereby to help steer and maneuver the apparatus 30, a pair of hydraulic actuators 73 are each pivotally attached at one end 74 to the dolly frame 66 with their rams 75 being pivotally attached to the fifth wheel assembly 68. Thus, hydraulic pressure furnished to the cylinders 73 will turn the dolly 65 horizontally about its fifth wheel axis while hydraulic pressure to the actuators 70 will either raise the dolly 65 toward the body 31 or raise the body 31 upward away from the dolly 65 when it is resting on the ground.

Near the rear end of the body 31 are provided a pair of outriggers 78 which serve to increase the lateral stability of the apparatus 30, particularly when it is carrying a heavy tubular section 32, as shown. These outriggers 78 may best be described with reference to FIGS. 1A, 2A and 3. Generally, each comprises a frame 79 to which is rotatably connected an axle mounting member 80. The latter is a bifurcated member supporting an axle and a wheel 81 and preferably has a fixed upright shaft 82 that is journaled in a bearing position of the frame 79 so that the wheel 81 can swivel. Pivotally connected to the upper end of the frame 79 is one end 83 of an actuator 84 whose other end 85 is pivotally connected to a bracket 86 fixed to the upper portion of the body 31. Extending between the upper and lower ends of each frame 79 are a pair of triangular shaped stabilizers 87. On the frame 79 the stabilizers 87 which are substantially parallel are each attached at one point 88, but both are pivotally attached at two points at their other ends 89 to the body 31. This arrangement gives more strength and stability to these outriggers 78, which are not intended to take the full load on the apparatus 30, but to provide lateral stability, particularly as the apparatus is being maneuvered when loaded. The outriggers 78 are, of course, extended or retracted as required from opposite sides of the body 31 by the actuators 84.

Figure 5:
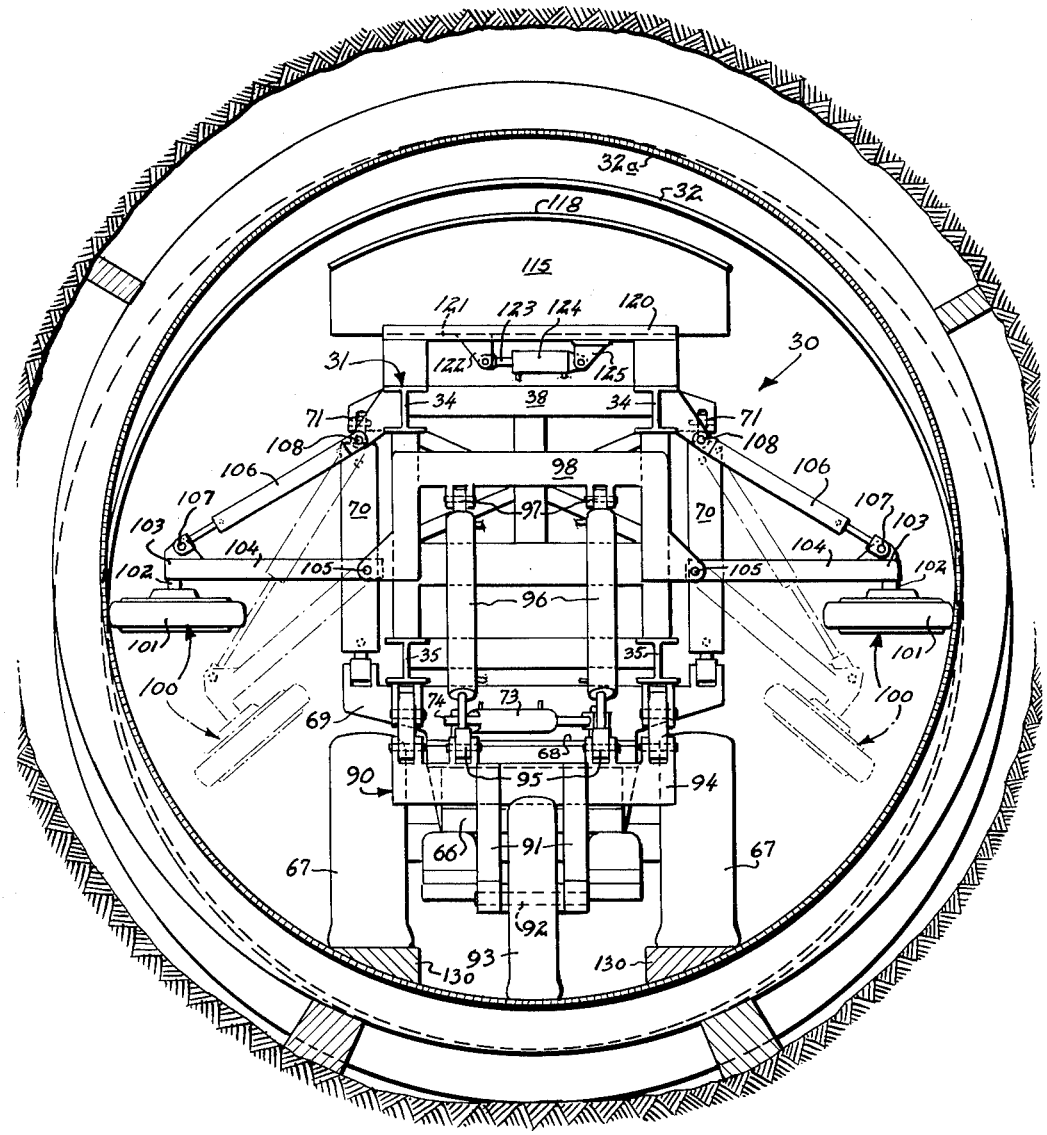
FIG. 5 is a front end view of the apparatus shown in FIGS. 1 and 2.

At the extreme forward end of the apparatus 30 is located the auxiliary dolly 90 which is also movable up or down with respect to the body 31. In the embodiment of FIGS. 1 to 12 the dolly 90 comprises a frame 91 supporting a pair of axles 92 on each of which is mounted a single wheel 93. As shown in FIG. 5, the upper end of the frame 91 has a transverse member 94 to which are pivotally attached the lower ends 95 of a pair of hydraulic actuators 96. The upper ends 97 of the actuators 96 are pivotally attached well above the dolly 90 to an extended transverse frame portion 98 on the body 31. A pair of stabilizing links 99 are pivotally attached at one end to the transverse frame member 94 on the dolly 90 outboard of the hydraulic actuators 96. At their other ends the links 99 are pivotally attached to the underside of the body 31.

Also pivotally attached near the front end of the elongated body 31 are a pair of idler wheel assemblies 100 that are horizontally extendable from opposite sides of the body 31. The idler wheels 101 themselves are rotatable about axles or spindles 102 that are disposed vertically when the wheels are in their operative extended position. A housing 103 which retains the axle 102 for each assembly 100 is rigidly fixed to the apex of an A-frame 104 that is pivotally attached to the body 31 by two axially aligned pin connections 105. A hydraulic actuator 106 is pivotally attached at one end 107 near the apex of the A-frame 104 and its other end 108 is pivotally attached to the body 31. When fully extended, the idler wheels 101 extend horizontally so that they will engage the inner walls of a tunnel section already in place and thereby help to guide the apparatus as it moves another tubular section into position. This position of the apparatus is shown in FIG. 5.

Spaced longitudinally from the movable idler wheels 101 towards the longitudinal center of the body 31 is another pair of idler wheels 110 which extend outwardly and are preferably fixed in this position rather than being retractable. These are mounted in the same way as the idler wheel assemblies 100 except that instead of the actuator 106, a fixed link 111 is provided that extends from the apex of the A-frame 112 to the body 31 where it is rigidly secured. Similarly, the inner ends of the A-frame are preferably rigidly fixed to the body rather than being pinned.

On the upper side of the body 31 of the apparatus 30 are a series of four saddle members 114, 115, 116 and 117. Each of these members has a generally convex shaped cap 118 preferably with a curvature equal to or slightly greater than that of the tubular section 32 being handled. As shown in FIG. 1B, two saddles 114 and 115 are located near the forward end of the apparatus fairly close together, and both are movable transversely on the body 31. The saddle 116 located nearest the rear end of the apparatus is also movable transversely, but the saddle 117 closely adjacent the saddle 116 may be fixed to the body 31 and located at a level slightly below (e.g. 2 to 4 inches) that of the other three saddles. The reason for this fixed saddle 117 being arranged at a lower level will become apparent during the description below of the operation of our apparatus. The saddles 114, 115 and 116 are each slidably mounted in a channel 120 that extends transverse to the longitudinal axis of the body and which is supported at opposite ends on opposite sides of the body 31. A centrally located longitudinal slot 121 is provided in the bottom of each channel 120 through which extends a bracket 122 that is fixed to the flat underside of the saddle member. Connected to the end of the bracket 122 extending below the channel 120 is the ram 123 of a hydraulic actuator 124, the cylinder of which is pivotally connected to a bracket 125, fixed to the underside of the channel 120. The actuators 124 on each of the movable saddles 114, 115 and 116 are all separately controllable, thereby enabling the saddles to be moved separately or in unison either direction when necessary to shift the position of the load laterally on the apparatus 31.

In the drawings, the various tubing runs, fittings, valves and controls for the hydraulic actuators have not been shown. All such components are utilized on the apparatus in accordance with well known engineering standards and it is believed unnecessary to show them in detail. The hydraulic system for operating all of the various actuators generally comprises a power source such as a standard combined engine and pump and a hydraulic supply tank. These are designated by the numerals 126 and 127 and are shown in a convenient location supported by a frame 128 at the rear end of the body 31. A control station may be provided elsewhere on the body for an operator at which a console of standard two-way commercially available control valves for controlling each of the actuators could be installed. Since the location and details of the operator's control station are not critical to the invention, they are not shown in FIGS. 1 to 12 in order to avoid complicating the drawings and the explanation of the present invention. For some applications of the apparatus 30 greater versatility may be provided for an operator by utilizing electrical remotely operable control valves, so that the switches therefor are portable or easily movable and can thereby allow the operator of the apparatus to move around when maneuvering the apparatus in tight places, as when it is in the tunnel cavity.

The operation of the apparatus 30 in lifting, transporting and maneuvering into position a large, tubular prefabricated tunnel section 32 may be best explained with reference to FIGS. 6 to 12. In FIG. 6, the apparatus is shown in the first step of picking up a tubular tunnel liner section 32 that is lying on the ground in a storage area. The apparatus supported by the main fore and aft dollies 40 and 65 is first maneuvered into axial alignment with the section by the tractor 33. Initially, the forward idler wheels 100 are extended and the auxiliary dolly 90 is retracted. However, as the forward end of the body 31 extends into the section, the auxiliary dolly 90 is extended downwardly to engage the inside bottom of the section. At this point the idler wheels 100 provide secondary lateral stability while the main forward dolly 65 is retracted up underneath the body and the apparatus is rolled further into the pipe section (FIG. 7). Once fully within the liner section, the main forward dolly 65 is lowered to again support the weight of the body. As shown in FIG. 5, a pair of wooden supports 130 with undersides shaped to fit the contour of the liner section and having level upper surfaces can be utilized within the section. With the wheels 67 supported on the level surfaces, any strain which would be caused by the sloped liner sides is removed.

Figure 10:
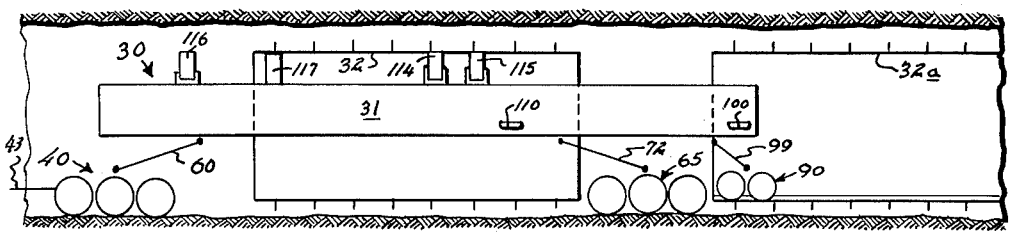
Figure 11:
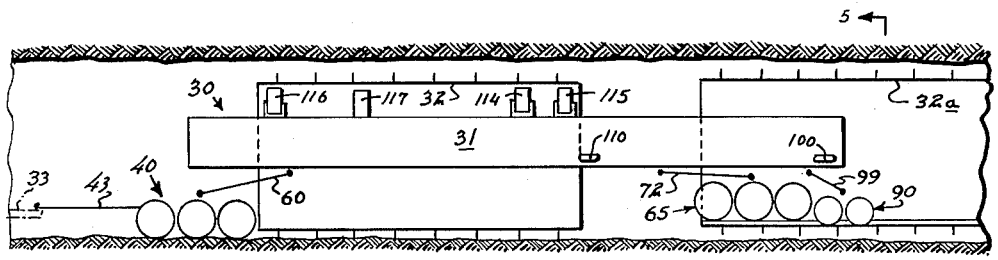
Figure 12:
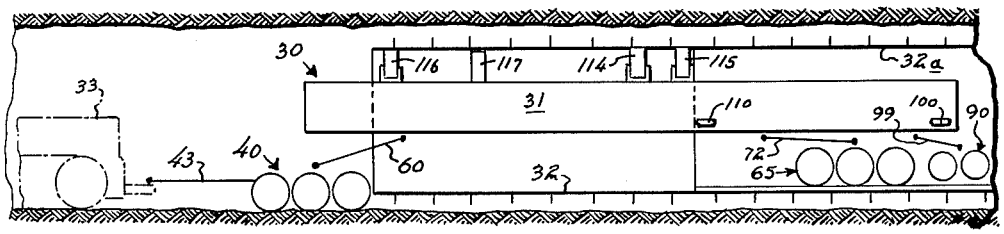

When the apparatus has moved to the point where the auxiliary dolly 90 extends beyond the end of the liner section, it is lowered to engage the ground and take the weight of the body 31 (FIG. 8). At this point the idler wheels 100 are outside of the liner section and may be retracted. Idler wheels 110 now function for secondary lateral stability. The apparatus then moves further ahead until the main front dolly 65 is free to be lowered and engage the ground. When this is down, the auxiliary dolly 90 can be retracted upwardly. During this entry procedure the outriggers 78 are in close proximity to the ground, providing primary lateral stability. The body can now be raised on the forward and aft dollies 40 and 65 until the saddles 114, 115 and 117 engage the top of the liner section and raise it upwardly free of the ground (FIG. 8). The apparatus is now free to transport the liner section and carry it into the tunnel to be aligned with and connected to a similar tunnel section already in place. When being carried, the aft end of the liner section is retained by the slightly lower fixed saddle 117 which prevents any possible lateral shifting and maintains the liner section firmly in position. As the liner section being carried approaches a section 32a already in place, the forward idler wheels 101 are raised into the extended position so they can engage the sides of the tunnel section 32a in place and help align with it the one being carried and again provide secondary lateral stability. As shown in FIG. 10, when the main forward dolly wheels are up close to the section in place, the body on the main dollies, including the auxiliary dolly, is lowered so that the latter can engage the section in place and the liner section being carried engages the ground. The forward dolly is now raised so that the apparatus can move ahead until the forward dolly is fully within the section in place. The liner section (FIG. 10) is now supported by the saddles 114 and 115 and the rear saddle 116 as it is raised by the forward and aft main dollies. The apparatus now can move ahead to bring the two tubular liner sections 32 and 32a together. If the sections are misaligned at all horizontally, the section being carried can be shifted laterally by means of the hydraulic actuators 124 on the saddles 114, 115 and 116. Any vertical adjustment can be made by controlling the actuators on the main dollies by lifting or lowering the section 32 slightly. When the liner sections have been brought together in satisfactory alignment they can be blocked or braced in place and the apparatus can be removed by suitable manipulation of the dollies.

A somewhat modified form of apparatus for transporting and maneuvering tunnel liner sections and designated by the numeral 140 is shown in FIGS. 13 to 23. In general, it embodies the previously described features of the present invention, as well as some different features that give increased performance under certain conditions.

Figure 13A:
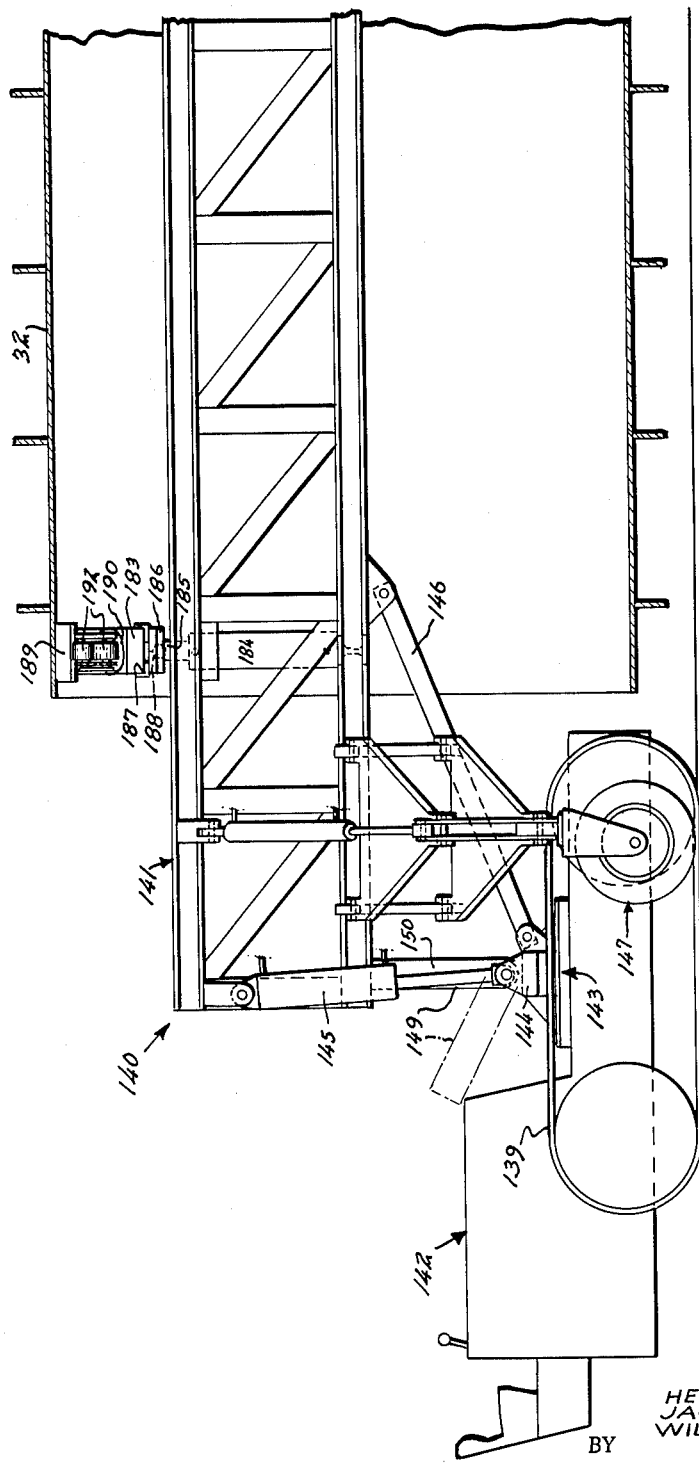
FIG. 13A is a partial view in elevation showing the rear portion of a modified form of tunnel liner apparatus according to the invention.

As shown in FIG. 13A, the apparatus 140 has an extended beam-like body 141 which can be shorter and thus lighter than the body 31 because of its various features which will be described. At its rear end, a self-powered dolly or tractor vehicle 142 is provided that directly supports the apparatus body 141. The vehicle 142 has its own power supply gear to drive wheels or a track 139 to move the apparatus on the ground, and it can also be equipped with a pump to furnish the necessary power for the various hydraulic actuators. The power supply, pump or hydraulic equipment, such as a reservoir, and the various hydraulic valves, controls and conduits are not shown as in the previous embodiment in order to simplify the explanation. A control station for an operator could be provided at any convenient location on the apparatus. Mounted on the frame of the vehicle 142 is a fifth wheel assembly, a bolster 144 and a pair of hydraulic actuators 145 connected from near the ends of the bolster 144 to the body structure, all of which may be constructed and arranged as in the previous embodiment of the invention. A pair of stabilizing links 146 are pivotally connected between the fifth wheel assembly 143 and the body 141.

The apparatus 140 may also be provided with outriggers 147 and near its forward end is a second main dolly 148, both of which may be similar to the outriggers and main dolly shown on the previous embodiment.

Figure 14:
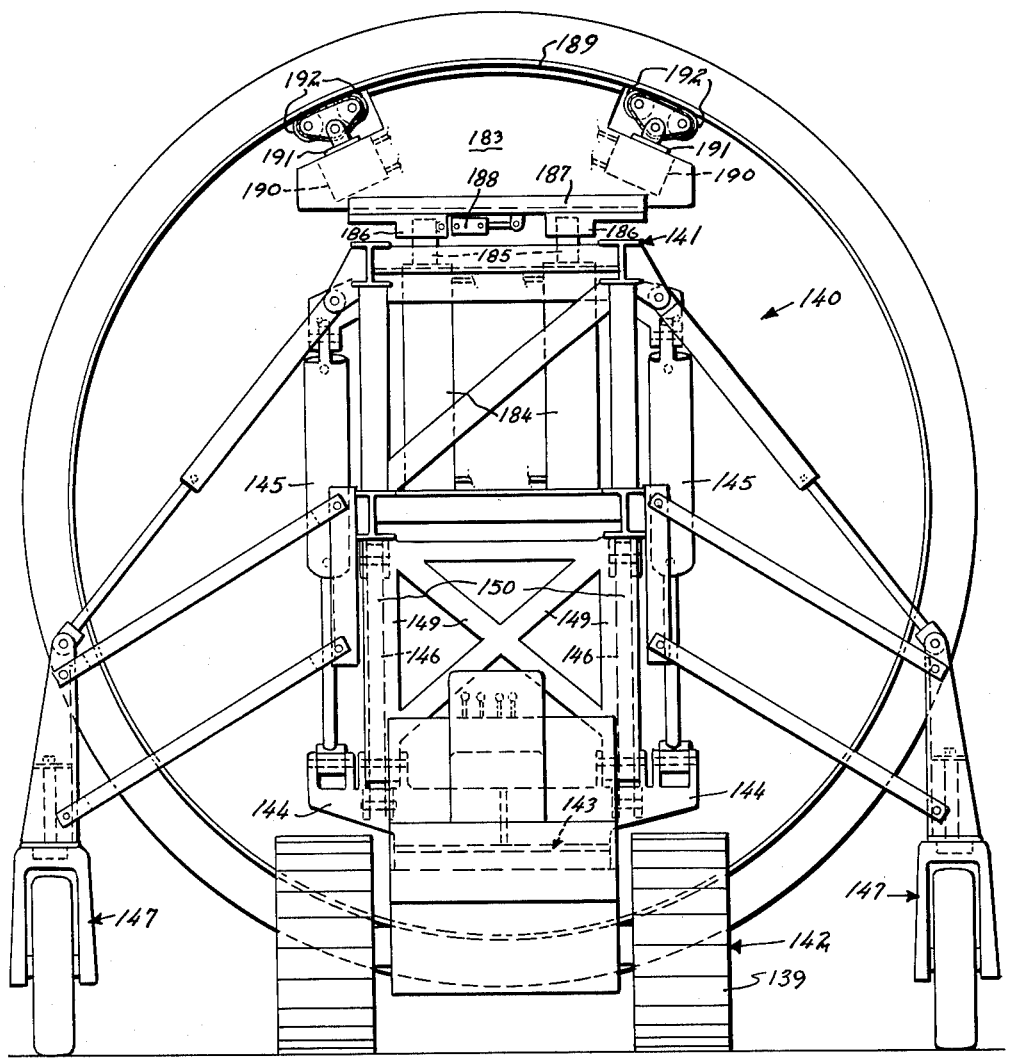
FIG. 14 is a rear end view in elevation of the apparatus shown in FIG. 13.

At the rear end of the apparatus a movable stabilizing support 149 may be provided to take the load off the actuators 145 under certain loading conditions. The support 149 is essentially a structural frame, as shown in FIGS. 13A and 14, having a pair of short beam members 150 which are pivotally connected to the bolster 144 at their lower ends and thus movable to an upright position to fit underneath the body 141 to support its weight at least partially when the body has been raised to a predetermined position.

Under certain loading conditions which may be aggravated by unusual positioning of the apparatus, severe side load components can develop and a means for counteracting these loads is required. In the present embodiment this problem is overcome by means of a pair of side-sway stabilizers 152 that are connected between each end of the bolster 153 on the forward dolly 148 and the body 141. As shown in detail in FIGS. 15 and 16, each stabilizer 152 comprises a first pipe section 154 which is pivotally connected at its lower end by means of a transverse pin 155 to a bracket 156 at the outer end of the dolly bolster 153. The first pipe 154 extends upward through a second larger pipe 157 that is pivotally connected to the end of a beam 158 which is fixed to and extends transversely across the body 141. Both of the pipes 154 and 157 are of high strength material and have wall thicknesses that provide high rigidity and bending strength. The larger outer pipe 157 has transverse pin members or trunnions 159 extending diametrically from opposite sides near its upper end which are rotatably supported by a bearing 160 fixed to the transverse beam 158. Fixed within the larger pipe 157 between the beam 158 and the bolster 153 is an annular bushing 161 which affords a running clearance with the smaller pipe 154. A similar bushing 162 is provided near the lower end of the large attached pipe 157. Near the lower edge of the body 141 and extending outwardly from each side thereof is a guide member 163 comprising a frame rotatably supporting an upright roller 164 at each corner (FIG. 17). The rollers 164 are always substantially parallel with the axis of the large pipe 157 and they are spaced from the pipe surface so as to allow only a limited amount of side movement of the pipe during various loading conditions. It should be apparent that a similar side-sway stabilizing means could be utilized on the rear bolster 144 also. Similarly, we may use such means on either one or both of the main dollies of the apparatus 30.

Figure 13B:
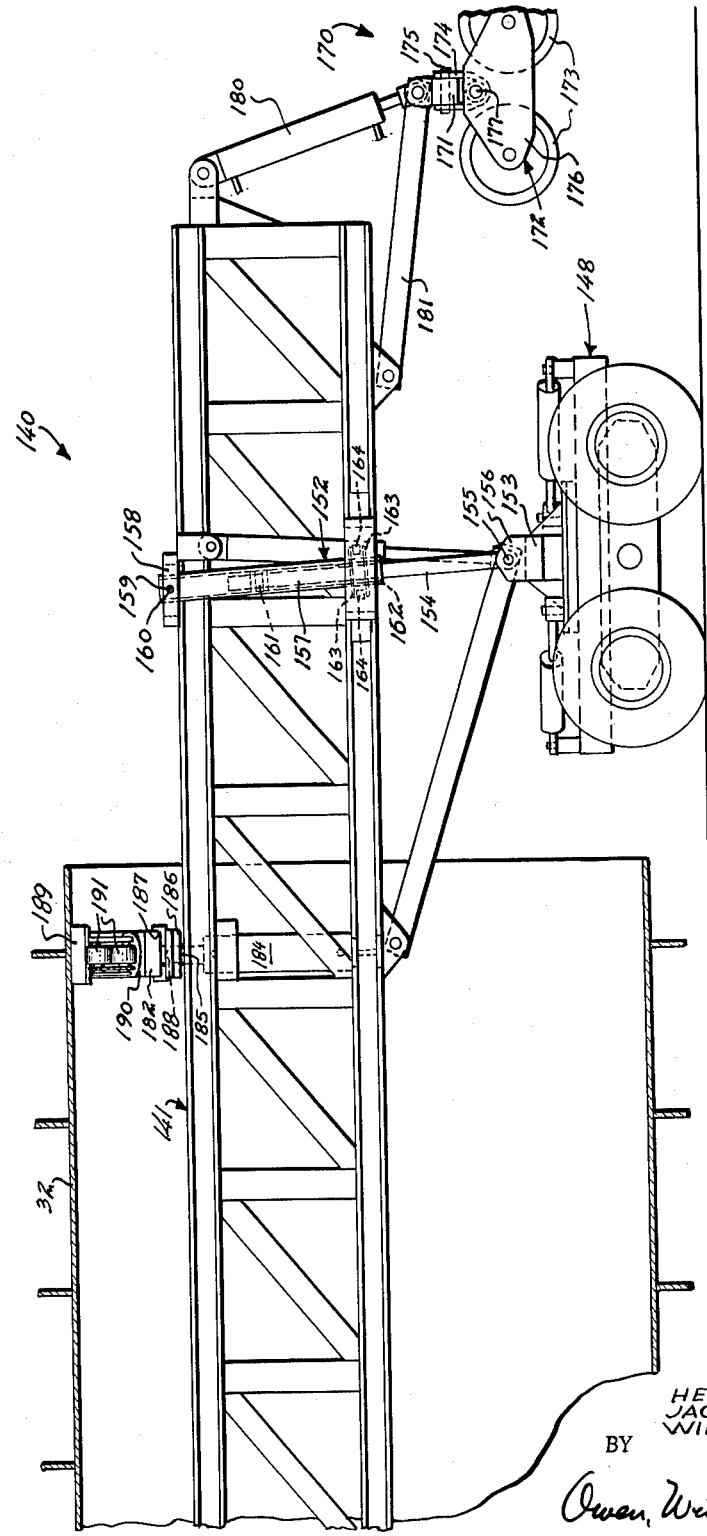
FIG. 13B is a partial view in elevation showing the front portion of the tunnel section shown in FIG. 13A.
Figure 15:
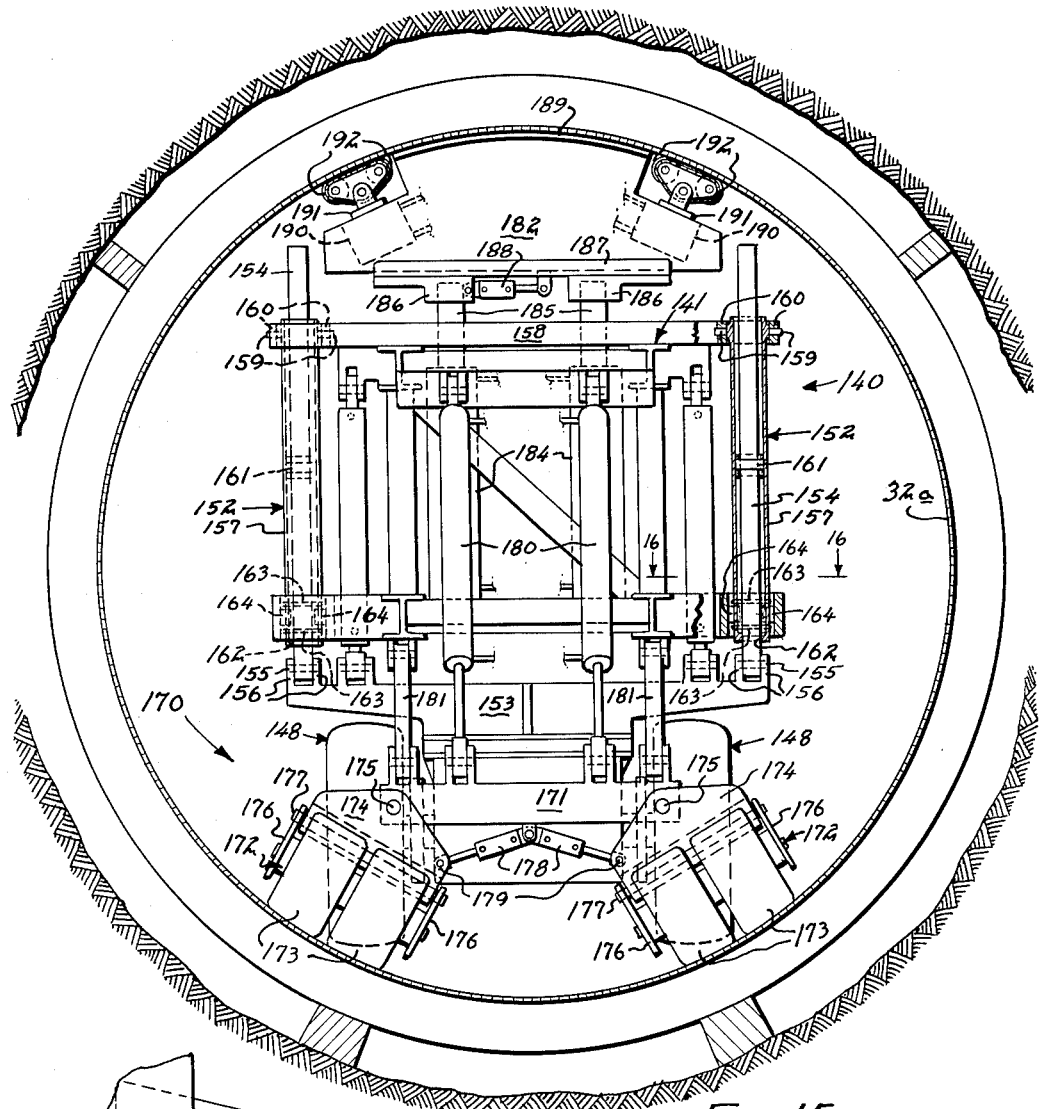
FIG. 15 is a front end view in elevation showing the apparatus of FIG. 13.
Figure 16:
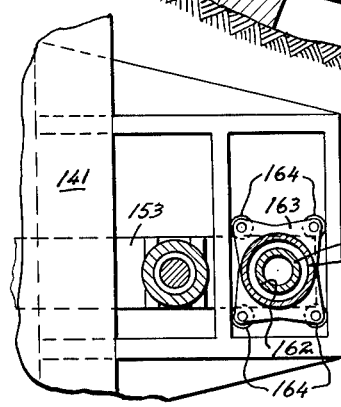
FIG. 16 is a view in cross section taken along line 16—16 of FIG. 15.

At the extreme forward end of the body 141 on the modified apparatus 140 is an auxiliary dolly 170 which is movable up and down with respect to the body 141. As shown in FIGS. 13B and 15, the dolly 170 comprises a transverse frame 171 to each end of which is pivotally attached a truck 172 having four or any suitable number of wheels 173. The wheels 173 are of the hard rubber type and are thus capable of supporting much greater loads than regular inflatable tires. At each end of the frame 171 a truck 172 is connected at an upper central bearing portion 174 by a longitudinal shaft 175. The aforesaid bearing portion is itself connected to a lower truck portion 176 by a lateral shaft 177. Thus, the trucks 172 and their wheels 173 can pivot in two directions to help them accommodate the slope of the surface which is engaged as the auxiliary dolly 170 is lowered. A pair of small hydraulic actuators 178 are attached at their cylinder ends to the center of the frame member 171 and the rams of these actuators are each connected to the inner corner 179 of one upper truck portion 174. Thus, the actuators 178 can swivel the trucks 172 outwardly to any desired angled position, so that when the auxiliary dolly 170 is lowered within a liner section, the truck wheels will engage the wall of the section evenly without any strain on the tires or the dolly itself.

The main lifting actuators 180 for the auxiliary dolly 170, as shown best in FIG. 15, are pivotally connected at the ram end to the frame member 171 and at the cylinder end of the body 141. A pair of link members 181 are also connected between the frame 171 and body to stabilize the dolly 170.

On the apparatus 140 only two saddle members 182 and 183 are utilized, but they are movable upwardly from the body in addition to being adjustable sideways as the saddles on the previous embodiment 30. For each saddle member 182 and 183 a pair of spaced apart hydraulic actuators 184 are provided which are rigidly supported on the body 141. The rams 185 for these actuators extend upwardly and are attached to the end portions 186 of a base member 187 for the underside of the saddle. The base member has a channel shaped cross section within which the saddle member is slidable, and an actuator 188 is utilized as previously described to cause the saddle member 182 or 183 to shift transversely when required. Each saddle member itself has an upper cap portion 189 whose radius of curvature is preferably equal to or somewhat greater than the radius of curvature of the liner section being handled. At the ends of the curved cap portion on each saddle member we may fix a relatively small actuator 190 having a short stroke ram 191 to the end of which are mounted a pair of rollers 192. These rollers are normally retracted within the extended line of curvature of the cap 189, but when the rams 191 are extended beyond this line of curvature, the rollers 192 engage the inner wall of the liner section being handled. By extending the rams 191 on one end or both ends of the saddles 182 or 183, the liner section can be rotated a small amount when this rotation is necessary to help position or align a section with another liner section already in place.

Figure 23:
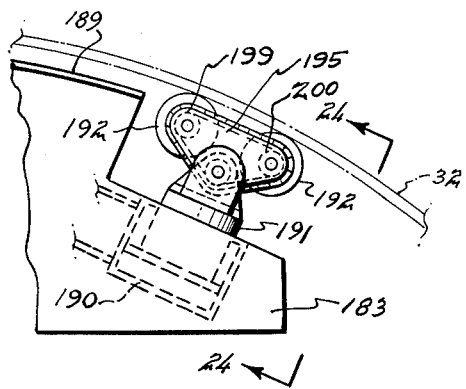
FIG. 23 is an enlarged end view of one end of a saddle having power driven rollers.
Figure 24:
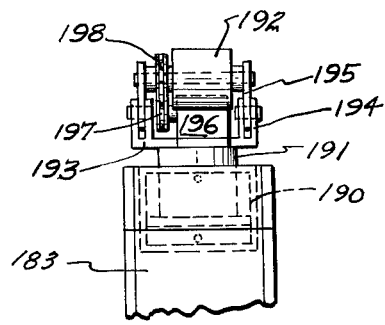
FIG. 24 is a view in side elevation taken along line 24—24 of FIG. 23.

In order to provide the force necessary for rotating the liner section on the rollers 192, at least one pair of these rollers are power driven. As shown in FIGS. 23 and 24, the end of each ram 191 is provided with a platform 193 having bearing supports 194 for pivotally mounting triangular shaped members 195, near the upper ends of which are journaled the rollers 192. On one platform 193 is mounted a drive motor 196, preferably hydraulic, and an attached gear box with a drive sprocket 197 on its output shaft. An endless chain 198 extends around the drive sprocket 197 and also around sprockets 199 and 200 fixed to the ends of each of the rollers 192. Actuation of the motor 196 will rotate the rollers in the direction desired, thereby causing the liner section supported on the rollers 192 to turn about its longitudinal axis. If the motor 196 is the hydraulic type, it can be included in the hydraulic system of the apparatus and controlled by a valve (not shown) in the conventional manner.

Figure 21:
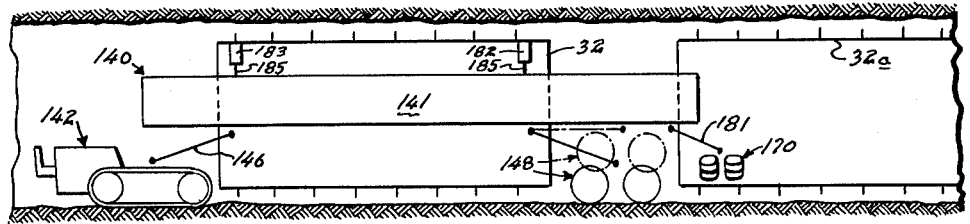
Figure 22:
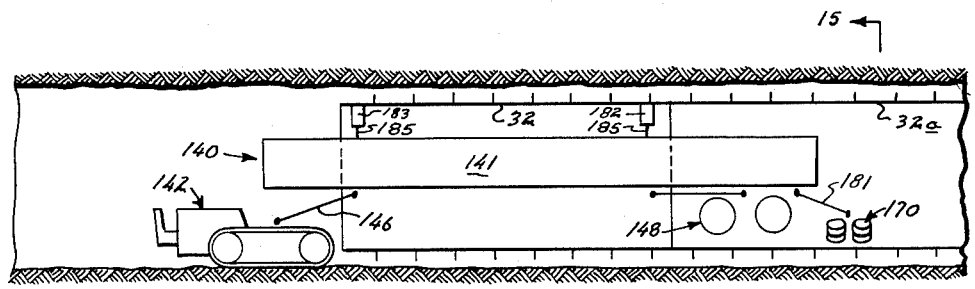

Although the operation of the apparatus 140 is similar to that of the previous embodiment, the increased versatility available will be apparent from a review of FIGS. 17 to 22. In FIG. 17 the apparatus 140 is shown with its front end within a liner section 32 about to be picked up with the auxiliary dolly 170 in the down position. FIG. 18 shows the trucks 172 canted outwardly so that their wheels 173 engage the surface of the liner section evenly. The auxiliary dolly 170 with its hard rubber wheels can thus fully support the body and with the main forward dolly 148 retracted, the apparatus can be advanced through the liner section. As the front end approaches the end of the section 32 the front main dolly 148 can be lowered until it supports the body 141 and when the body extends outwardly, the auxiliary dolly 170 is lowered to engage the ground (see FIGS. 18 to 20). With the power mover 142 now supporting the body, the saddles 182 and 183 can be raised independently to lift the section 32 off the ground a sufficient amount so that it can be transported into the tunnel and joined together with a similar section 32a already in place. In FIG. 21 the apparatus is shown as it approaches the section in place and as the body extends into the latter, the auxiliary dolly 170 is lowered with its wheels 173 again angled outwardly to achieve a firm footing within the curved wall section. The main forward dolly 148 is now retracted and the body is moved ahead until the two liner sections are joined together (FIG. 22). If small adjustments in positioning are required at the junction, the saddles 182 and 183 can be moved laterally by the rams 188. If rotation of the tubular section is necessary the rams 191 can be actuated to first lift the section free of the saddle, and the motor 196 can be energized to drive the rollers 192 and turn the section. This rotation is accomplished at a slow positive rate so that the section can be stopped at the desired position. Any vertical adjustment can, of course, be accomplished by control of the saddle actuators 185 which move them vertically. The procedure for removal of the apparatus from the tunnel after the sections are perfectly aligned should be readily apparent.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. An apparatus for lifting, transporting and positioning a large heavy tubular section, said apparatus comprising:
   an elongated body having a length greater than the tubular section;
   a first multiple wheel dolly connected to said body near its rear end;
   means attached to said first dolly for moving said body up and down within predetermined limits and for maintaining said body at any desired intermediate position;
   a second multiple wheel dolly connected to said body and spaced apart from said first support means;
   means attached to said second dolly for moving said body up or down between limits and for maintaining it at any intermediate predetermined position, or for retracting or extending said second dolly towards or away from said body when its wheels are not on the ground supporting the body weight;
   an auxiliary multiple wheel dolly connected to the front end of said body comprising a transverse frame, a pair of wheel trucks pivotally mounted to the ends of said transverse frame for partial rotation about axes parallel to the longitudinal axis of the body, whereby said wheel trucks can be positioned to engage evenly the sloped inner walls of a tubular section;
   means for retracting and extending said auxiliary dolly between limits;
   and means on the upper side of said body for engaging the inside of a tubular section being transported after the body has been positioned completely through the tubular section.

2. The apparatus as described in claim 1 wherein said wheel trucks of said auxiliary dolly have wheels having hard rubber noninflatable tires, and actuator means connected to both said wheel trucks for canting said trucks outwardly to conform with sloped surfaces before the wheel trucks are allowed to support the full load of the body.

3. An apparatus for lifting, transporting and positioning heavy tubular sections, said apparatus comprising:
   an elongated body member having a length greater than that of a tunnel section being transported;
   a first main dolly connected to said body near its rear end;
   a second main dolly member connected to said body near to but spaced from its front end;
   an auxiliary dolly connected to said body at its front end near said second main dolly;
   means for independently moving each of said dollies closer to or farther away from said body and for maintaining them at any intermediate position between the fully extended or retracted positions when they are either supporting the body or freely suspended from it;
   retractable outriggers including wheels adapted to engage the ground outside the dolly wheels;
   extendable idler wheels near the front end of said body and adapted to engage the inner walls of a tubular section in place to help align the one being installed which is being carried by the apparatus;
   and side shifting saddle members mounted at spaced apart locations on the upper side of said body member for engaging the inside of a tubular section being transported.

4. The apparatus as described in claim 3 wherein said first main dolly is self-propelled and includes a power means drivingly connected to wheels or tracks for moving the apparatus over the ground.

5. The apparatus as described in claim 3 including a hydraulic actuator interconnecting each said saddle member with said body for moving said saddle members up and down on said body.

6. An apparatus for lifting, transporting and positioning a large heavy tubular section, said apparatus comprising:

an elongated beam-like body having a length greater than the tubular section having means on its upper side for engaging the inside of a tubular section;

a first multiple wheel support means connected to said body near its rear end;

means attached to said first support means for moving said body up and down within predetermined limits and for maintaining said body at any desired intermediate position;

a second multiple wheel support means rotatably connected to said body and spaced apart from said first support means;

means attached to said second support means for moving said body up or down between limits and for maintaining it at any intermediate predetermined position, or for retracting or extending said second support means towards or away from said body when its wheels are not on the ground supporting the body weight;

an auxiliary multiple wheel dolly connected to the front end of said body;

means connected to said auxiliary dolly and said body for retracting and extending it between predetermined limits independently of said first and second support means;

an stabilizing means connected to said body and to said second wheel support means for preventing side sway of the body.

7. The apparatus as described in claim 6 wherein said stabilizing means comprises at least one pair of rigid telescoping members, including a first said member being attached at one end to said second wheel support means and a second said member attached to said body, said members being movable axially relative to each other when the body is raised and being thereby adapted to prevent lateral movement of the body when the apparatus is loaded.

8. The apparatus as described in claim 7 wherein said first telescoping member comprises a pipe pivotally attached to said body at its upper end and restrained for limited movement within a bearing fixed to the lower side of said body; fixed bearing rings spaced apart with in said first telescoping member; said second telescoping member being pivotally attached to said second wheel support means and slidably engaged with said first telescoping member.

9. The apparatus as described in claim 8 wherein said second wheel support means includes a bolster rotatably mounted on frame supporting a plurality of wheels, and a second telescoping member for a pair of said stabilizing means pivotally attached to opposite ends of said bolsters.

10. An apparatus for lifting, transporting and positioning a large heavy tubular section, said apparatus comprising:

an elongated beam-like body having a length greater than the tubular section;

a first multiple wheel support means connected to said body near its read end and including a bolster rotatably connected by a fifth wheel to a frame, said frame supporting a plurality of wheels;

means attached to said bolster for moving said body up and down within predetermined limits and maintaining said body at any desired intermediate position;

a second multiple wheel support means spaced forward from said first support means on said body and including a frame supporting a plurality of wheels and having a fifth wheel, a bolster rotatably mounted on said fifth wheel and hydraulic means for rotating said latter frame and its wheels to steer the apparatus;

means attached to said latter bolster for moving said body up or down between limits and for maintaining it at any intermediate predetermined position, or for retracting or extending said second support means towards or away from said body when its wheels are not on the ground supporting the body weight;

an auxiliary multiple wheel dolly connected to the front end of said body;

means connected to said axiliary dolly and said body for retracting and extending it between predetermined limits;

and means on the upper side of said body for engaging the inside of a tubular section being transported after the body has been positioned completely through the tubular section.

11. An apparatus for lifting, transporting and positioning large heavy tubular sections, said apparatus comprising:

an elongated body member having a length greater than that of a tunnel section being transported;

a first main dolly connected to said body near its rear end;

a second main dolly member spaced from said first dolly and connected to said body nearer to its front end;

an auxiliary dolly connected to said body forward of said second main dolly;

means connected to each of said dollies and to said body for independently moving said dollies closer to or farther away from said body and for maintaining them at any intermediate position between the fully extended or retracted positions when they are either supporting the body or freely suspended from it;

spaced apart saddle means connected to said body member and having a curved cap portion for engaging the inside of a tubular section being transported;

roller means at the ends of said cap portion on at least one said saddle;

means for extending said roller means outwardly beyond the continued line of curvature of said cap portion, thereby lifting the tubular section free thereof;

and means for driving said roller means when engaged with the tubular section on said apparatus for rotating the section a desired amount.

12. The apparatus as described in claim 11 wherein said means for extending said roller means comprises a pair of hydraulic actuators at opposite ends of said saddle having rams to the ends of which said rollers are attached; said means for driving said rollers comprising a hydraulic motor mounted on the end of said ram and mechanically connected to said rollers.

13. An apparatus for lifting, transporting and positioning a large heavy tubular section, said apparatus comprising:

an elongated body having a length greater than the tubular section;

a first multiple wheel dolly connected to said body near its rear end;

means attached to said first dolly for moving said body up and down within predetermined limits and for maintaining said body at any desired intermediate position;

a second multiple wheel dolly connected to said body and spaced apart from said first support means;

means attached to said second dolly for moving said body up or down between limits and for maintaining it at any intermediate predetermined position, or for retracting or extending said second dolly towards or away from said body when its wheels are not on the ground supporting the body weight;

an auxiliary dolly connected to the front end of said body having at least one wheel substantially aligned with the longitudinal center line of said body;

means for retracting and extending said auxiliary dolly between limits;

means on the upper side of said body for engaging the inside of a tubular section being transported after the body has been positioned completely through the tubular section; and a pair of outrigger wheel members connected near the rear end of said body and extendable outwardly therefrom beyond the wheels of said first dolly member to provide additional lateral stability when a tubular section is being transported.

14. An apparatus for lifting, transporting and positioning a large heavy tubular section, said apparatus comprising:
an elongated body having a length greater than the tubular section;
a first multiple wheel dolly connected to said body near its rear end;
means attached to said first dolly for moving said body up and down within predetermined limits and for maintaining said body at any desired intermediate position;
a second multiple wheel dolly connected to said body and spaced apart from said first support means;
means attached to said second dolly for moving said body up or down between limits and for maintaining it at any intermediate predetermined position, or for retracting or extending said second dolly towards or away from said body when its wheels are not on the ground supporting the body weight;
an auxiliary dolly connected to the front end of said body having at least one wheel substantially aligned with the longitudinal center line of said body;
means for retracting and extending said auxiliary dolly between limits; and
means on the upper side of said body for engaging the inside of a tubular section being transported after the body has been positioned completely through the tubular section and comprising a series of spaced apart saddle members including first and second movable saddle members spaced apart on said body a distance somewhat less than the length of the tubular section being transported and having the same height, and a third fixed saddle member between said first and second saddle members spaced closer to said first saddle member near the rear end of said body and having a height less than the other said saddle members.

15. The apparatus as described in claim 14 wherein at least said first and second saddle members are slidable in a direction transverse to the longitudinal center line of the body, and actuator means connected to each of said first and second saddle members for moving them independently to any predetermined position when it is necessary to shift laterally the tubular section supported thereon.

16. The apparatus as described in claim 15 including a pair of idler wheels pivotally mounted near the front end of said body, and means for extending said wheels outwardly to opposite sides of the body whereby said wheels are oriented for rotation about substantially vertical axes and located at a distance apart substantially equal to the inside diameter of the tubular section being transported, whereby said idler wheels are adapted to align said body and the tubular section being transported with a similar tubular section already in place and to increase or assure stability while traveling on single tandem wheels of the dolly.

17. The apparatus as described in claim 16 including a second set of idler wheels mounted in the extended position on opposite sides of said body and spaced longitudinally from the front end of said body.

18. An apparatus for lifting, transporting and positioning a large heavy tubular section, comprising:
an elongated beam-like body having a length greater than the tubular section;
a first dolly means connected to said body near its rear end and a second dolly means spaced from said first dolly means and connected to said body near its forward end, each said dolly including a frame supporting a plurality of wheels, a bolster rotatably mounted on a fifth wheel fixed to said frame, hydraulic actuator means and stabilizing link means both connected to said bolster and said body, said actuator means being adapted to move said body up and down within predetermined limits to any desired intermediate postion, said second dolly means being also retractable or extendable towards or away from said body when its wheels are not on the ground supporting the body weight;
an auxiliary multiple wheel support means connected to the front end of said body;
actuator means for retracting and extending said auxiliary wheel support means towards and away from said body between limits;
means attached to the upper side of said body for engaging the inside of a tubular section being transported after the body has been positioned completely through the tubular section; and
a pair of outrigger assemblies connected near the rear end of said body, each said assembly comprising a wheel frame rotatably supporting at least one wheel, at least one stabilizing link pivotally connected between each said wheel frame and said body, and a hydraulic actuator connected to said wheel frame and said body, said outrigger wheels being thus extendable to a ground engaging position well beyond the dolly wheels and yet retractable to a position close to the body to facilitate transport of the apparatus when not loaded.

19. An apparatus for lifting, transporting and positioning a large heavy tubular section, comprising:
an elongated beam-like body having a length greater than the tubular section;
a first dolly means connected to said body near its rear end and a second dolly means spaced from said first dolly means and connected to said body near its forward end, each said dolly including a frame supporting a plurality of wheels, a bolster rotatably mounted on a fifth wheel fixed to said frame, hydraulic actuator means and stabilizing link means both connected to said bolster and said body, said actuator means being adapted to move said body up and down within predetermined limits to any desired intermediate position, said second dolly means being also retractable or extendable towards or away from said body when its wheels are not on the ground supporting the body weight;
an auxiliary multiple wheel support means connected to the front end of said body;
actuator means for retracting and extending said auxiliary wheel support means towards and away from said body between limits;
means attached to the upper side of said body for engaging the inside of a tubular section being transported after the body has been positioned completely through the tubular section; and
alignment means connected to and extending outwardly from opposite sides of said body near its forward end, said alignment means including guide wheels at its extremities adapted to engage the inner walls of a tubular section in place to align the body and the tubular section being carried with the section in place.

20. An apparatus for lifting, transporting and positioning a large heavy tubular section, comprising:
an elongated beam-like body having a length greater than the tubular section;
a first dolly means connected to said body near its rear end and a second dolly means spaced from said first dolly means and connected to said body near its forward end, each said dolly including a frame supporting a plurality of wheels, a bolster rotatably mounted on a fifth wheel fixed to said frame, hydraulic actuator means and stabilizing link means both connected to said bolster and said body, said actuator means being adapted to move said body up and down within predetermined limits to any desired intermediate position, said second dolly means being also retractable or extendable towards or away from said body when its wheels are not on the ground supporting the body weight;

an auxiliary multiple wheel support means connected to the front of said body;

actuator means for retracting and extending said auxiliary wheel support means towards and away from said body between limits; and means attached to the upper side of said body for engaging the inside of a tubular section being transported after the body has been positioned completely through the tubular section, said latter means comprising a plurality of saddle members, at least two of said saddle members being spaced apart near opposite ends of said body, at least one of said spaced apart saddle members including means for adjusting the position of a tubular section on said body by moving it transversely to its longitudinal center line.

21. The apparatus as described in claim 20 wherein at least two of said saddle members comprise a channel shaped guide base fixed to said body, a movable saddle section having a flat sided bottom adapted to fit within said channel base and an upper curved cap portion adapted to engage the inside of the tubular section being transported, a hydraulic actuator connected at one end to said channel guide base with its other end connected to said movable saddle section.

22. An apparatus for lifting, transporting and positioning a large heavy tubular section, said apparatus comprising:

an elongated beam-like body having a length greater than the tubular section;

a first multiple wheel support means connected to said body near its rear end and comprising a steerable vehicle including a power plant for driving wheels or tracks, a frame and a bolster rotatably connected to said frame;

means attached to said first support means for moving said body up and down within predetermined limits and for maintaining said body at any desired intermediate position, said latter means comprising hydraulic actuator means and stabilizing link means connected to said bolster and said body;

a second multiple wheel support means rotatably connected to said body and spaced apart from said first support means;

means attached to said second support means for moving said body up and down between limits and for maintaining it at any intermediate predetermined position, or for retracting or extending said second support means towards or away from said body when its wheels are not on the ground supporting the body weight;

an auxiliary multiple wheel dolly connected to the front end of said body;

means connected to said auxiliary dolly and said body for retracting and extending it between predetermined limits; and means on the upper side of said body for engaging the inside of a tubular section being transported after the body has been positioned completely through the tubular section.

23. The apparatus as described in claim 22 wherein said means on said body for engaging said tubular section comprises a plurality of saddle members contoured to fit the inner surface of a tubular section, at least two of said saddle members beiing located near opposite ends of said body.

24. The apparatus as described in claim 23 including means for moving said saddle members up and down with respect to said body.

25. The apparatus as described in claim 23 wherein at least one of said saddle members includes a channel shaped guide base, a central saddle member having a flat bottom disposed within said guide base and a curved cap portion adapted to engage the inner curved wall portion of a tubular member being transported, and a pair of extendable roller assemblies mounted at opposite ends of said movable saddle member, each of said roller assemblies being attached to the ram end of a hydraulic actuator fixed within said movable saddle member and being thereby extendable to a point beyond the normal line of curvature of said cap portion, whereby said roller assemblies when extended can support the weight of the tubular section and enable the tubular section to be rotated to align it with a similar such section already in place.

26. The apparatus as described in claim 25 including means for moving said central saddle member transversely within its guide base within fixed predetermined limits.

27. An apparatus for lifting, transporting and positioning large heavy tubular sections, said apparatus comprising:

an elongated body member having a length greater than that of a tunnel section being transported;

a first main dolly connected to said body near its rear end;

a second main dolly member spaced from said first dolly and connected to said body nearer to its front end;

an auxiliary dolly connected to said body forward of said second main dolly;

means connected to each of said dollies and to said body for independently moving each of said dollies closer to or farther away from said body and for maintaining them at any intermediate position between the fully extended or retracted positions when they are either supporting the body or freely suspended from it;

spaced apart saddle means connected to said body member for engaging the inside of a tubular section being transported, each said saddle means including a channnel shaped guide base, a central saddle member movable within said guide base and a curved upper cap portion adapted to engage the inner curved wall portion of a tubular member being transported, roller means mounted at opposite ends of said movable saddle member, each being attached to the ram end of a hydraulic actuator fixed within said movable saddle member and being thereby extendable to a point beyond the normal line of curvature of said cap portion, whereby said roller means can be positioned to support the weight of the tubular section normally on a saddle member and thereby enable the tubular section to be rotated on the rollers to align it with a similar section already in place; and means for raising said saddle means independently with respect to said body, whereby the tubular section can be lifted to and maintained at any predetermined position.

28. The apparatus as described in claim 27 including actuator means for moving said central saddle member transversely within its guide base within fixed predetermined limits.

References Cited by the Examiner

UNITED STATES PATENTS 2,954,136  9/1960  Butler _____ 214—1

MARVIN A. CHAMPION, *Primary Examiner.*